United States Patent
Park

(10) Patent No.: US 7,251,511 B2
(45) Date of Patent: Jul. 31, 2007

(54) PORTABLE COMMUNICATION APPARATUS WITH DATA-INPUTTING EXPANSION

(75) Inventor: Joo-Hyung Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 513 days.

(21) Appl. No.: 10/386,272

(22) Filed: Mar. 11, 2003

(65) Prior Publication Data
US 2004/0204066 A1    Oct. 14, 2004

(30) Foreign Application Priority Data
Oct. 24, 2002   (KR)   ............ 10-2002-0065258

(51) Int. Cl.
*H04B 1/38*     (2006.01)
*H04M 1/00*   (2006.01)
(52) U.S. Cl. ............ 455/575.3; 455/575.1; 455/575.4; 455/575.8; 455/566
(58) Field of Classification Search ............ 455/575.3, 455/575.1, 575.4, 575.8, 566
See application file for complete search history.

(56) References Cited

U.S. PATENT DOCUMENTS

| | | | |
|---|---|---|---|
| 5,898,774 A * | 4/1999 | Shindo ............... | 379/433.13 |
| 6,266,234 B1 * | 7/2001 | Leman ................ | 361/680 |
| 6,349,040 B2 * | 2/2002 | Lefort ................ | 455/90.1 |
| 6,434,404 B1 * | 8/2002 | Claxton et al. ....... | 455/575.3 |
| D488,453 S * | 4/2004 | Chang et al. ......... | D14/138 |
| 6,842,627 B2 * | 1/2005 | Harsu et al. .......... | 455/575.3 |

* cited by examiner

*Primary Examiner*—Lana N. Le
*Assistant Examiner*—Wen W. Huang
(74) *Attorney, Agent, or Firm*—The Farrell Law Firm

(57) ABSTRACT

Disclosed is a portable communication apparatus with a data-inputting expansion comprising a main housing having a display device; a rotatable housing having first and second data-inputting devices on its upper and lower surfaces, respectively, the rotatable housing rotatably connected to the main housing while facing the main housing; a connecting portion with a contact surface exposed on one side of the front surface of the main housing; a first terminal with a contact surface exposed on one side of the rear surface of the rotatable housing, the first terminal being connected to the first data-inputting device; and a second terminal with a contact surface exposed on the other side of the rear surface of the rotatable housing, the second terminal being connected to the second data-inputting device, wherein connection is made between the connecting portion and one of the first or second terminals, as chosen by the rotation of the rotatable housing.

9 Claims, 8 Drawing Sheets

PORTABLE COMMUNICATION APPARATUS WITH DATA-INPUTTING EXPANSION

PRIORITY

This application claims priority to an application entitled "Portable Communication Apparatus With Data-inputting Expansion" filed with the Korean Intellectual Property Office on Oct. 24, 2002 and assigned Serial No. 2002-65258, the contents of which are hereby incorporated by reference.

BACKGROUND OF THE INVENTION

1. Field of the Invention

The present invention relates to a portable communication apparatus including a PDA (Personal Digital Assistant), a HHP (Hand-Held PC), a cellular telephone, etc., and more specifically to a portable communication apparatus with a data-inputting expansion for convenient data-inputting operation, and in particular, to a PDA with a data-inputting expansion.

2. Description of the Related Art

In general, "a portable communication apparatus" means an apparatus carried by a user and used for performing wireless communication with another person. Such portable communication apparatuses are classified into various types by appearance: for example, into bar-type apparatuses, flip-type apparatuses and folder-type apparatuses. The bar-type apparatus has a single bar-type housing; the flip-type apparatus comprises a bar-type housing and a flip or a cover connected to the housing rotatably by a hinge mechanism; and the folder-type apparatus comprises a single housing and a folder capable of being folded through a rotatable connection to the housing by a hinge mechanism.

In addition, portable communication apparatuses can also be classified into neck wearable-type apparatuses and wrist wearable-type apparatuses in view of their positions worn on human body or the way they are worn. The neck wearable-type apparatus is carried by wearing the terminal around a user's neck using a cord, and the wrist wearable-type apparatus is carried on a user's wrist.

Furthermore, conventional portable communication apparatuses may also be classified into rotation-type apparatuses and sliding-type apparatuses according to the way they are opened and closed. The rotation-type apparatus is opened and closed by the rotation of its two housings facing each other and connected together, and the sliding-type apparatus is opened and closed when one of its two housings slides in a longitudinal direction while facing the other. The above-mentioned portable communication apparatuses, classified by a variety of standards, will be easily understood by those skilled in the art.

Meanwhile, the conventional portable communication apparatuses described above comprise antenna devices for transmitting/receiving signals, data-inputting/outputting devices, and optional data transmitting/receiving devices. Of course, keypads consisting of a number of keys, for data-inputting mainly through a finger press operation, are well-known and widely used as data-inputting devices. Touch pads and touch screens are also available. In addition, LCDs are generally used as data outputting devices.

Keypads, commonly used for data-inputting, are composed of an array of a number of keys. The keys reveal their upper surfaces in a way that allows users to input data through a finger press operation as desired. Furthermore, conventional portable communication apparatuses may comprise a camera lens as a photographing means which enables users to perform visual communication with another person or to photograph desired subjects.

However, the desire for information is on an increasing trend, and as a matter of fact, it is particularly inconvenient to communicate with conventional portable terminals in an internet environment or multimedia environment. Specifically, in the case of PDAs used for personal data management, the actual number of keys mounted as a data-inputting means is limited, since the minimization of the size of the body of the terminal is an important issue. Therefore, conventional portable communication apparatuses have an economic disadvantage in that additional data-inputting devices must be used by mounting them to the body of the apparatus through interfacing connectors.

SUMMARY OF THE INVENTION

Accordingly, an object of the present invention is to provide a portable communication apparatus with a data-inputting expansion.

Another object of the present invention is to provide a portable communication apparatus capable of providing a data-inputting expansion through inclusion of a rotatable housing.

In order to accomplish these objects, there is provided a portable communication apparatus, comprising: (a) a main housing having a display device; (b) a rotatable housing having first and second data-inputting devices on its upper and lower surfaces, respectively, the rotatable housing being connected to the main housing in order to be capable of rotating while facing the main housing; (c) a connecting portion with a contact surface exposed on one side of the front surface of the main housing; (d) a first terminal with a contact surface exposed on one side of the rear surface of the rotatable housing, the first terminal being connected to the first data-inputting device; and (e) a second terminal with a contact surface exposed on the other side of the rear surface of the rotatable housing, the second terminal being connected to the second data-inputting device, wherein signals are transmitted by connection between the connecting portion and one of the first and second terminals, as chosen by the rotation of the rotatable housing.

In accordance with another aspect of the present invention, there is provided a portable communication apparatus comprising: (a) a main housing having a display device and an annular receiving portion recessed inward from the front surface of the main housing; (b) a rotatable housing having first and second data-inputting devices on its upper and lower surfaces, respectively, as well as an annular insert engaging with the annular receiving portion rotatably, the rotatable housing being connected to the main housing in order to be capable of rotating while facing the main housing; (c) a connecting portion extending along the longitudinal direction of the annular receiving portion with a contact surface exposed thereon; (d) a first terminal extending along the longitudinal direction of the annular insert with a contact surface exposed thereon, the first terminal being connected to the first data-inputting device; and (e) a second terminal extending along the longitudinal direction of the annular insert with a contact surface exposed thereon, the second terminal being connected to the second data-inputting device, wherein signals are transmitted by connection between the connecting portion and one of the first and second terminals, as chosen by the rotation of the rotatable housing.

In accordance with another aspect of the present invention, there is provided a portable communication apparatus comprising: (a) a main housing having a pair of arms extending in one direction symmetrically and a rotation space formed between the pair of arms; (b) a rotatable housing having first and second data-inputting devices on its upper and lower surfaces, respectively, the rotatable housing being received in the rotation space and being supported by the pair of arms, and being connected to the main housing in order to be capable of rotating in a direction approaching the main housing or in the opposite direction; (c) a connecting portion with a contact surface exposed on the pair of arms; (d) a first terminal with a contact surface exposed on one side of the lateral surface of the rotatable housing, the first terminal being connected to the first data-inputting device; and (e) a second terminal with a contact surface exposed on the other side of the lateral surface of the rotatable housing, the second terminal being connected to the second data-inputting device, wherein signals are transmitted by connection between the connecting portion and one of the first and second terminals, as chosen by the rotation of the rotatable housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, portable communication apparatuses according to preferred embodiments of the present invention will be described with reference to the accompanying drawings. The following description of the present invention omits a detailed description of well known functions and configurations to avoid obscuring the subject matter of the present invention with unnecessary detail.

Figure 1:
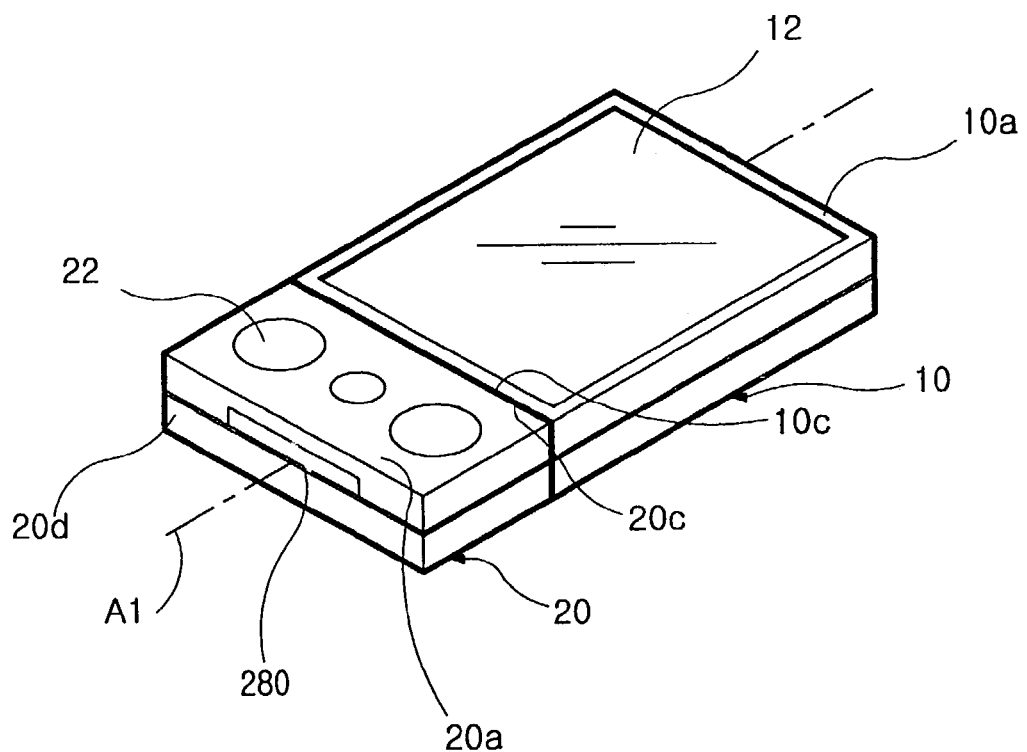
FIG. 1 is a perspective view of a portable communication apparatus according to a first preferred embodiment of the present invention.
Figure 2:
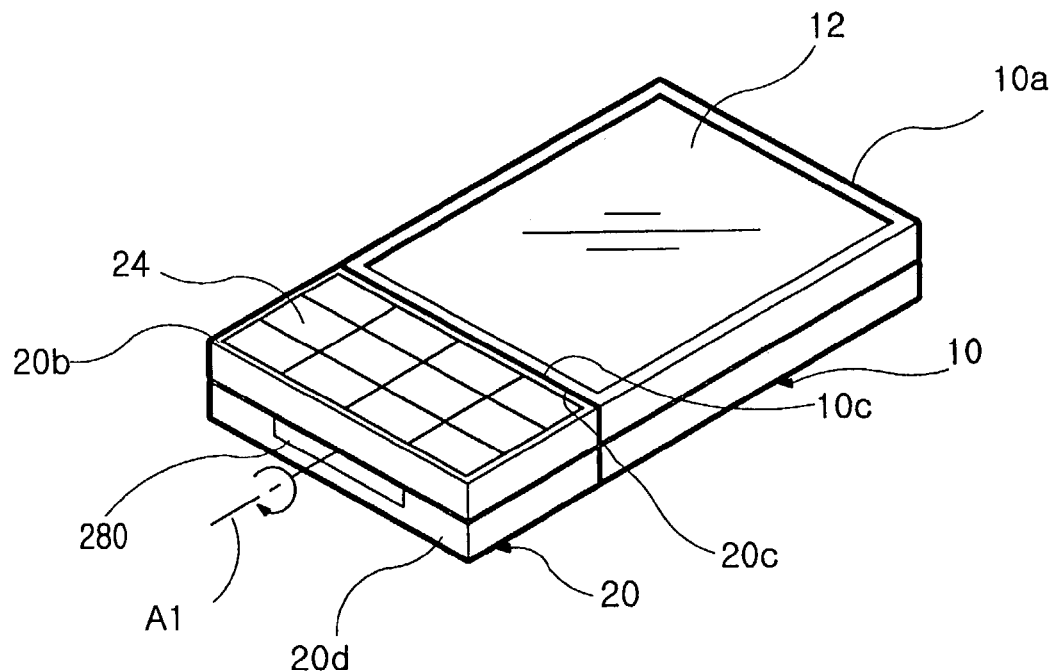
FIG. 2 is a perspective view showing the first rotatable housing of FIG. 1 rotated 180°.

As shown in FIGS. 1 and 2, a portable communication apparatus according to a first preferred embodiment of the present invention consists of a first main housing 10 and a first rotatable housing 20 capable of providing a data-inputting expansion through rotation relative to the first main housing 10 while facing it. The first rotatable housing 20 can rotate 180° about a hinge axis A1. The first main housing 10 is provided with a display unit 12 on its upper surface 10a. Preferably, the display unit 12 is a LCD as known in the art.

The first rotatable housing 20 has an upper surface 20a, a lower surface 20b, a rear surface 20c, and a front surface 20d. The upper surface 20a is provided with a first key inputting device 22 composed of a number of keys, and the lower surface 20b is provided with a second key inputting device 24 composed of a number of keys. Also, an interfacing connector 280 is disposed on the front surface 20d of the first rotatable housing 20. It should be noted that the first and second key inputting devices 22 and 24 can be replaced with touch-sensitive panels or touch screens. Then, a stylus such as those known in the art may be used to input data through a writing operation.

Figure 3:
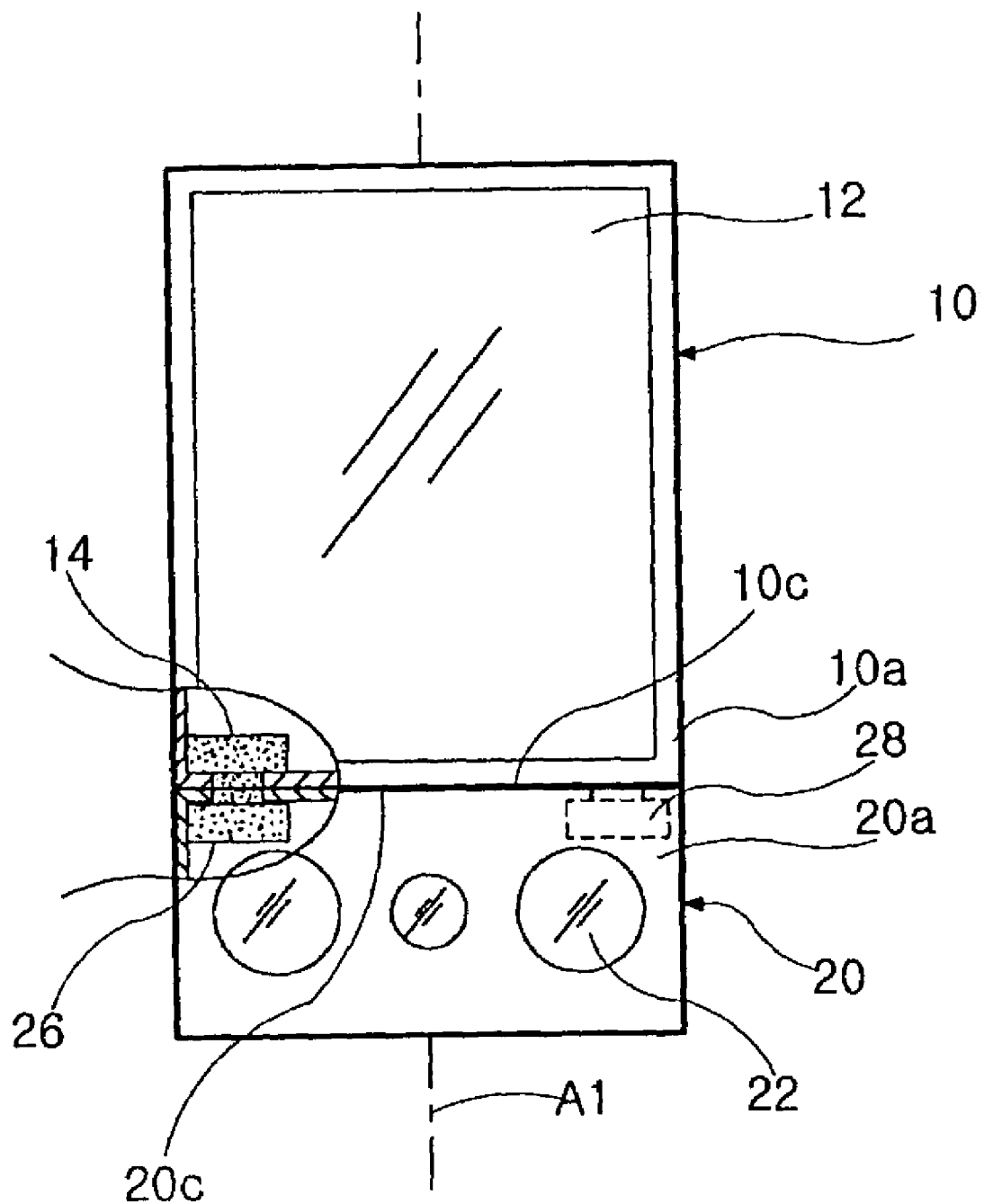
FIG. 3 is a partial-cutaway plan view showing the contact structure of the portable communication apparatus of FIG. 1.
Figure 4:
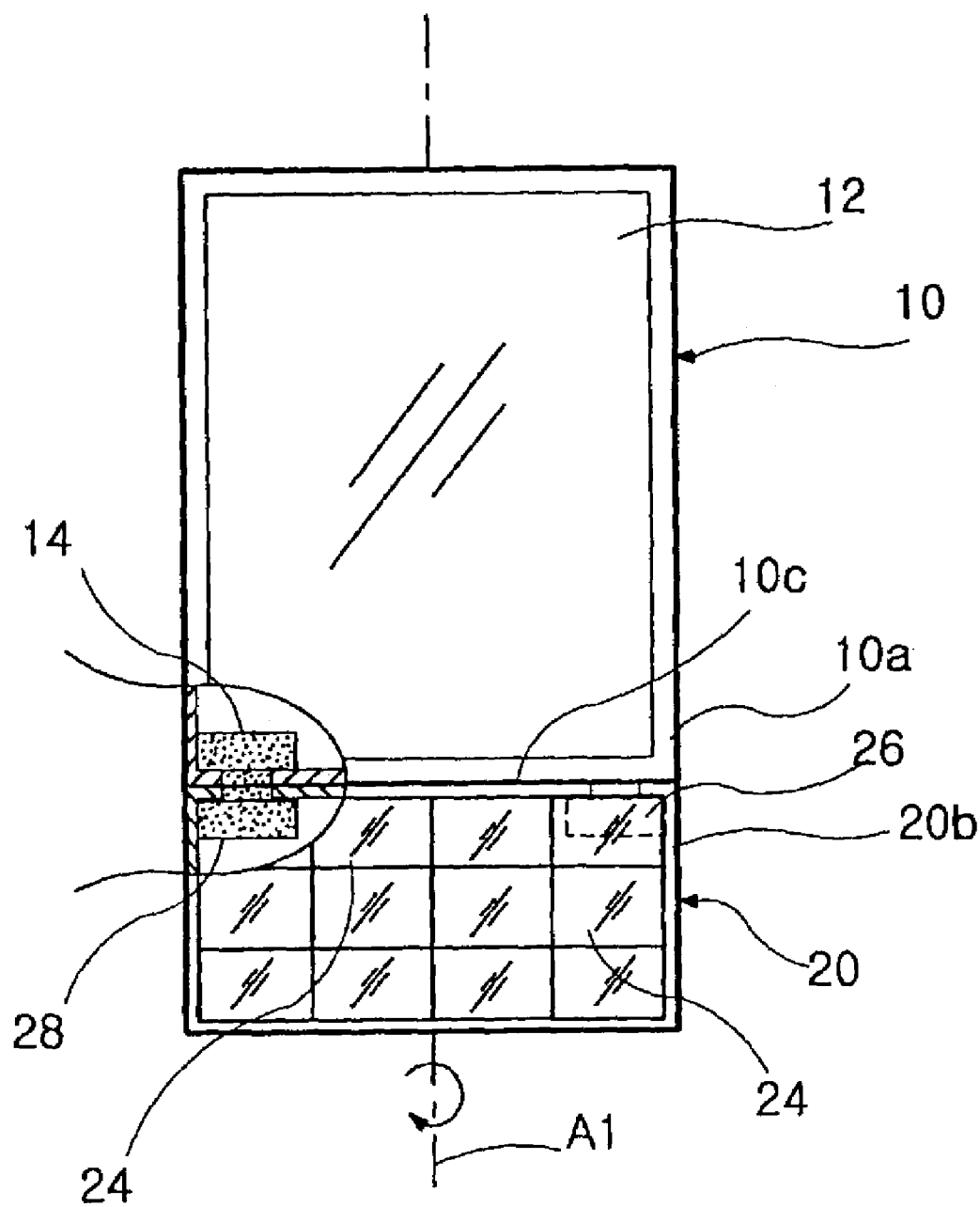
FIG. 4 is a partial-cutaway plan view showing the contact structure of the portable communication apparatus of FIG. 2.

A contact structure of the portable communication apparatus according to the first preferred embodiment of the present invention will now be explained with reference to FIGS. 3 and 4. The first main housing 10 is provided with a first contact portion 14 on a front surface 10c. And, the rear surface 20c of the first rotatable housing 10, which is rotatable relative to the front surface 10c of the first main housing 10 while facing it, is provided with a first terminal 26 connected to the first key inputting device 22, and a second terminal 28 connected to the second key inputting device 24. The first contact portion 14 is positioned on one side of the front surface 10c of the first main housing 10. The first terminal 26 is positioned on one side of the rear surface 20c of the first rotatable housing 20, while the second terminal 28 is positioned on another, opposite side of the rear surface 20c. Connection structures between the first terminal 26 and the first key inputting device 22, and between the second terminal 28 and the second key inputting device 24 are not shown.

Accordingly, in a state as shown in FIG. 1, the first contact portion 14 and the first terminal 26 are connected together; while in a state as shown in FIG. 2, i.e. when the first rotatable housing 20 has been rotated 180° relative to the first main housing 10, the first contact portion 14 is connected to the second terminal 28. The hinge axis A1 extends in a longitudinal direction relative to the first main housing 10 and the first rotatable housing 20. Therefore, the first rotatable housing 20 performs rotating movement with its rear surface 20c facing the front surface 10c of the first main housing 10.

For the contact structure described above, the first contact portion 14 has a contact surface exposed on the front surface 10c of the first main housing 10, and the first and second terminals 26, 28 also have contact surfaces exposed on the rear surface 20c of the first rotatable housing 20. This establishes a contact structure between the first contact portion 14 and one of the first and second terminals 26 and 28, whichever contacts the first contact portion 14, their contact surfaces facing each other.

Consequently, the portable communication apparatus according to the first preferred embodiment of the present invention realizes a mode change by establishing a selective contact structure between the first main housing 10 and the first rotatable housing 20, depending on whether the first rotatable housing 20 is rotated 180° or not, thus providing a data-inputting expansion.

As shown in FIGS. 5 through 8, a portable communication apparatus according to a second preferred embodiment of the present invention consists of a second main housing 30 and a second rotatable housing 40 capable of providing a data-inputting expansion through rotation relative to the second main housing 30 while facing it. The second rotatable housing 40 can rotate 180° about a hinge axis A2.

The second main housing 30 is provided with a display unit 32 on its upper surface 30a. Preferably, the display unit 32 is a LCD as known in the art.

The second rotatable housing 40 has an upper surface 40a and a lower surface 40b. The upper surface 40a is provided with a first key inputting device 42 composed of a number of keys, and the lower surface 40b is provided with a second key inputting device 44 composed of a number of keys. It should be noted that the first and second key inputting devices 42 and 44 can be replaced with touch-sensitive panels or touch screens. Then, a stylus such as those known in the art may be used to input data through a writing operation.

The hinge axis A2 of the second rotatable housing 40 extends in the longitudinal direction. Accordingly, the second rotatable housing 40 performs rotating movement with its rear surface 40c facing the front surface 30c of the second main housing 30.

Figure 5:
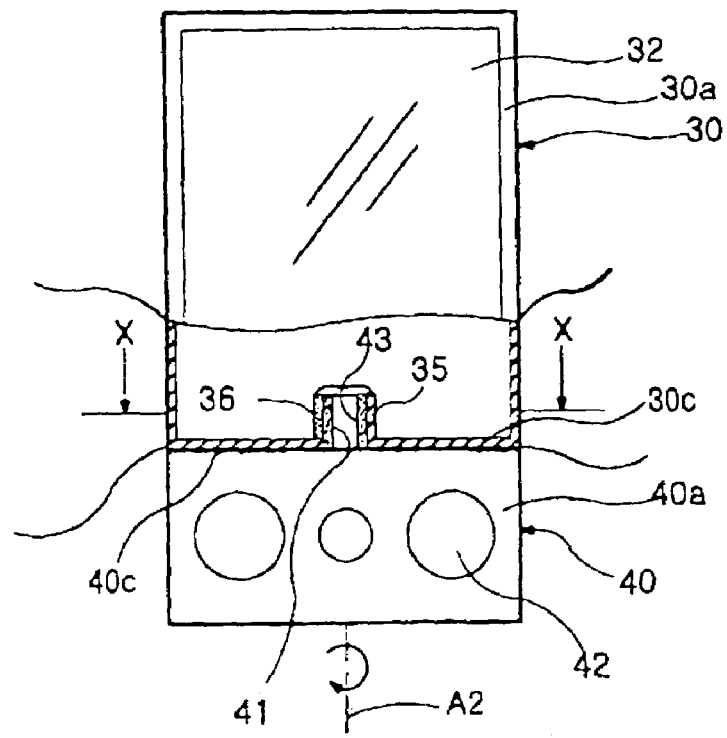
FIG. 5 is a partial-cutaway plan view showing the contact structure of a portable communication apparatus according to a second preferred embodiment of the present invention.
Figure 6:
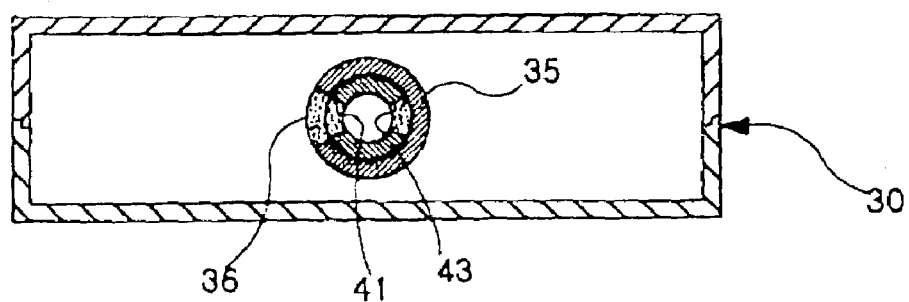
FIG. 6 is a sectional view taken along the line X-X in FIG. 5.
Figure 7:
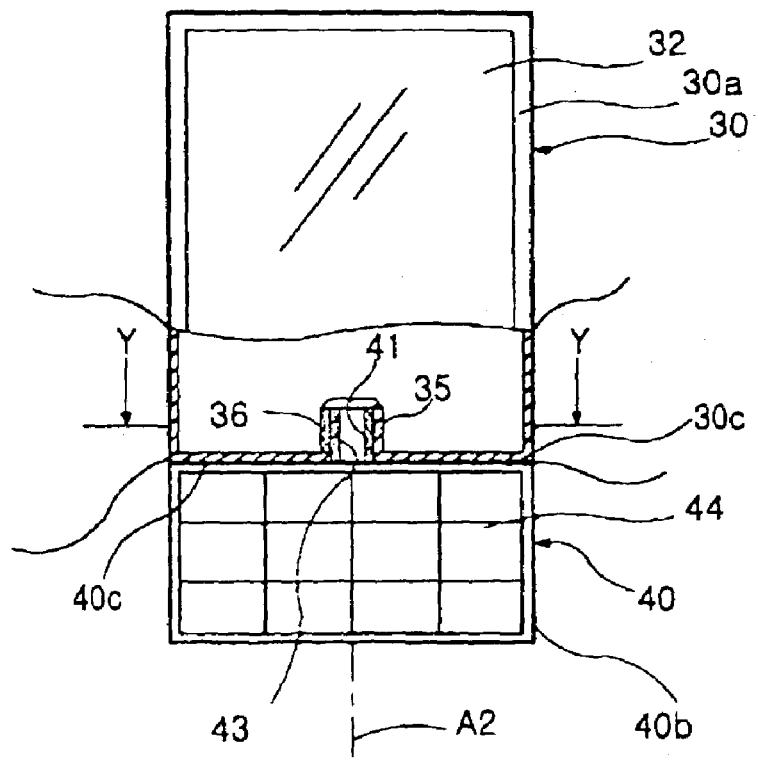
FIG. 7 is a partial-cutaway plan view showing the contact structure of the portable communication apparatus of FIG. 5 with its second rotatable housing rotated 180°.
Figure 8:
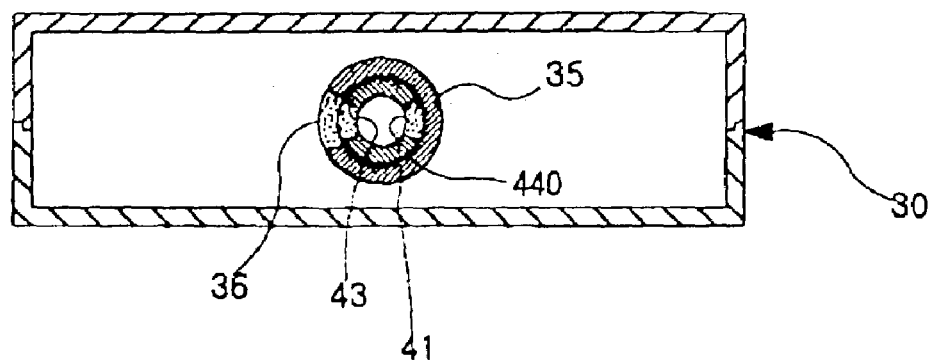
FIG. 8 is a sectional view taken along the line Y-Y in FIG. 7.
Figure 9:
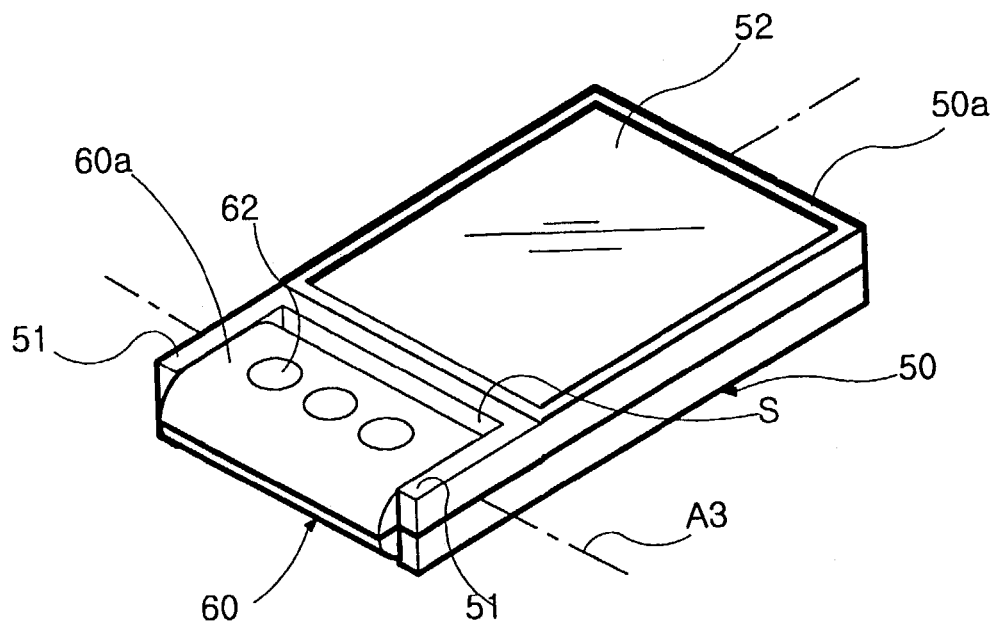
FIG. 9 is perspective view of a portable communication apparatus according to a third preferred embodiment of the present invention.
Figure 10:
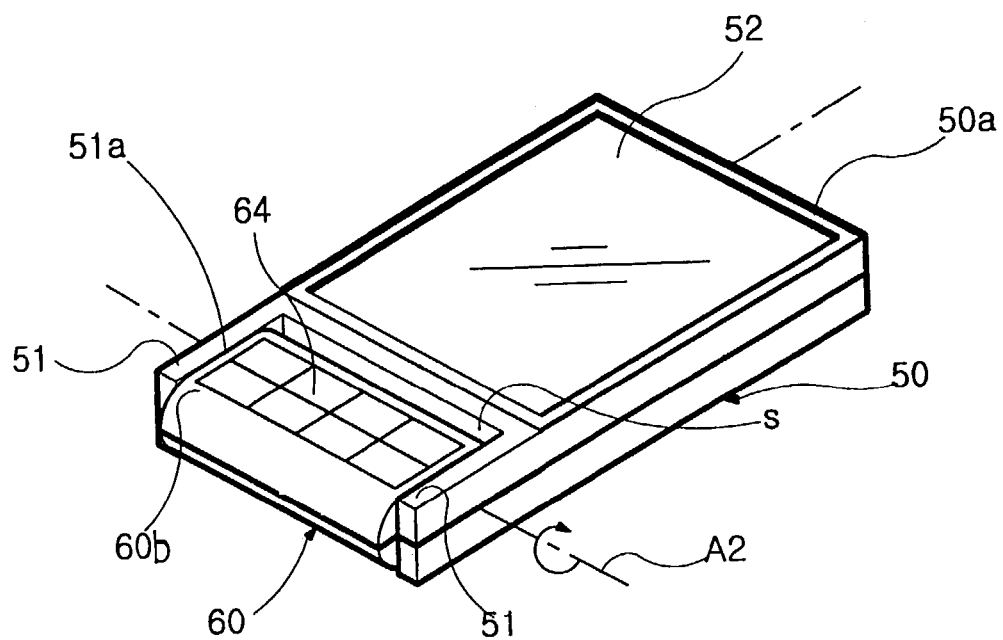
FIG. 10 is a perspective view showing the third rotatable housing of FIG. 9 rotated 180°.

The contact structure of the portable communication apparatus according to the second preferred embodiment of the present invention will now be explained with reference to FIGS. 5 through 8. The front surface 30c of the second main housing 30 is provided with an annular receiving portion 35 recessed inward, and, within the annular receiving portion 35, a second contact portion 36 extends in the longitudinal direction. Moreover, the rear surface 40c of the second rotatable housing, rotatable relative to the front surface 30c of the first main housing 30 while facing it, is provided with an annular insert 440 that is received in and engages with the annular receiving portion 35. The annular insert 440 is provided with a first terminal 41 connected to the first key inputting device 42, and a second terminal 43 connected to the second key inputting device 44. The second contact portion 36 extends in the longitudinal direction of the annular receiving portion 35. The first terminal 41 extends in the longitudinal direction of the annular insert 440 on one side of the peripheral surface thereof, while the second terminal 43 extends in the longitudinal direction of the annular insert 440 on another, opposite side thereof. Accordingly, in a state as shown in FIG. 5, the second contact portion 36 and the first terminal 41 are connected together; while in a state as shown in FIG. 7, i.e., when the second rotatable housing 40 has been rotated 180° relative to the second main housing 30, the second contact portion 36 is connected to the second terminal 43.

For the contact structure described above, the second contact portion 36 has a contact surface exposed on the annular receiving portion 35, and the first and second terminals 41, 43 also have contact surfaces exposed on the annular insert 440. This establishes a contact structure between the second contact portion 36 and one of the first and second terminals 41 and 43, whichever contacts the second contact portion 36, their contact surfaces facing each other.

Consequently, the portable communication apparatus according to the second preferred embodiment of the present invention realizes a mode change by establishing a selective contact structure between the second main housing 30 and the second rotatable housing 40, depending on whether the second rotatable housing 40 is rotated 180° or not, thus providing a data-inputting expansion.

As shown in FIGS. 9 through 12, a portable communication apparatus according to a third preferred embodiment of the present invention consists of a third main housing 50, a third rotatable housing 60 capable of providing a data-inputting expansion through rotation while received in the third main housing 50, and a pair of arms 51 extending from the third main housing 50 and supporting the third rotatable housing 60 rotatably. The third rotatable housing 60 can rotate 180° about a hinge axis A3 in a direction approaching the third main housing 50, or in the opposite direction.

The third main housing 50 is provided with a display unit 52 on its upper surface 50a. Preferably, the display unit 52 is a LCD as known in the art. Furthermore, the pair of arms 51 extend from the third main housing 50 in one direction, facing each other symmetrically. A rotation space S is formed between the pair of arms 51, and the third rotatable housing 60 is received in the rotation space S and rotated therein. Also, the hinge axis A3 extends through the pair of arms 51.

The third rotatable housing 60 has an upper surface 60a, a lower surface 60b and a first lateral surface 60c. The upper surface 60a is provided with a first key inputting device 62 composed of a number of keys, and the lower surface 60b is provided with a second key inputting device 64 composed of a number of keys. It should be noted that the first and second key inputting devices 62 and 64 can be replaced with touch-sensitive panels or touch screens. Then, a stylus such as those known in the art may be used to input data through a writing operation.

Figure 11:
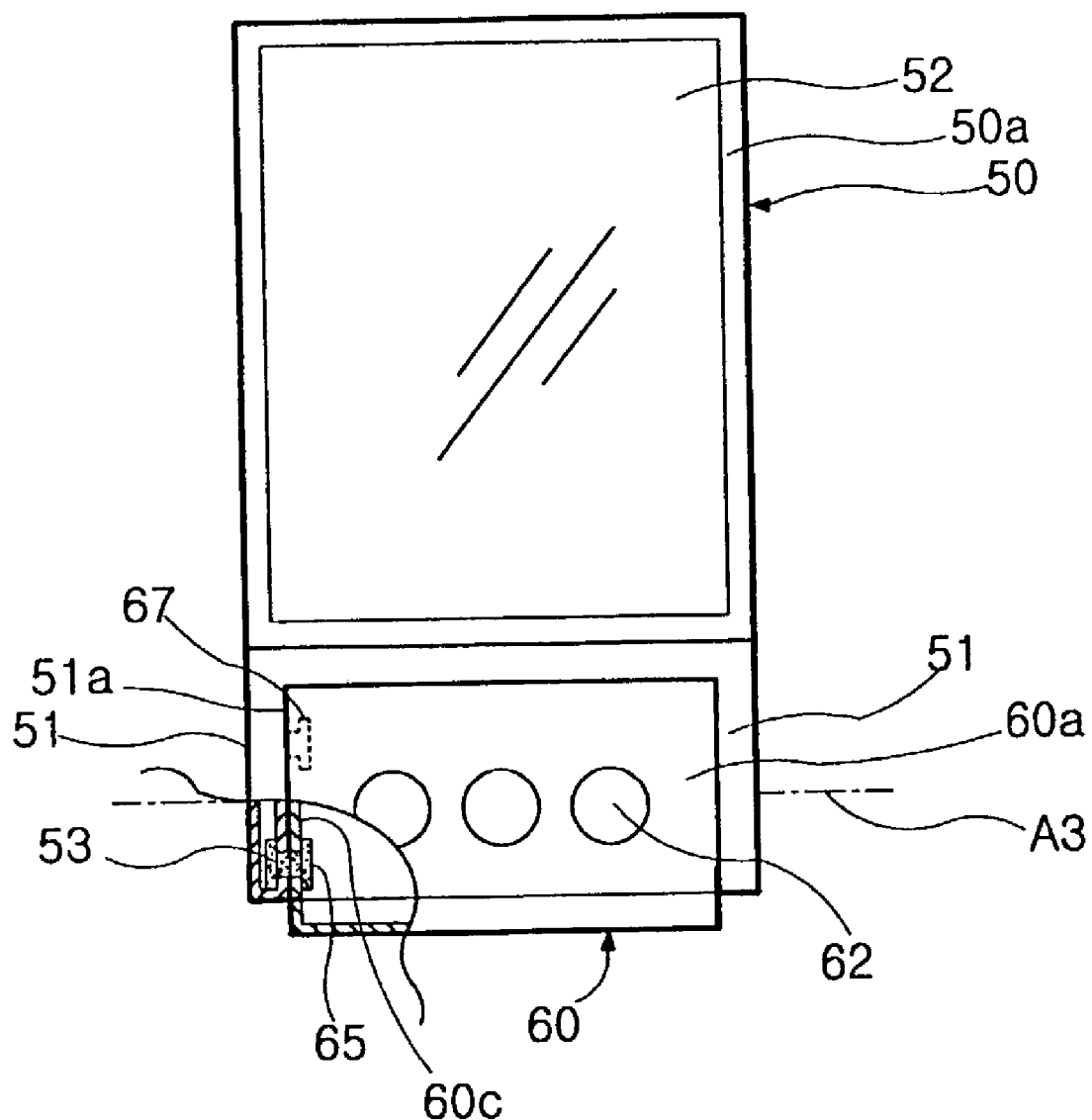
FIG. 11 is a partial-cutaway plan view showing the contact structure of the portable communication apparatus of FIG. 9.
Figure 12:
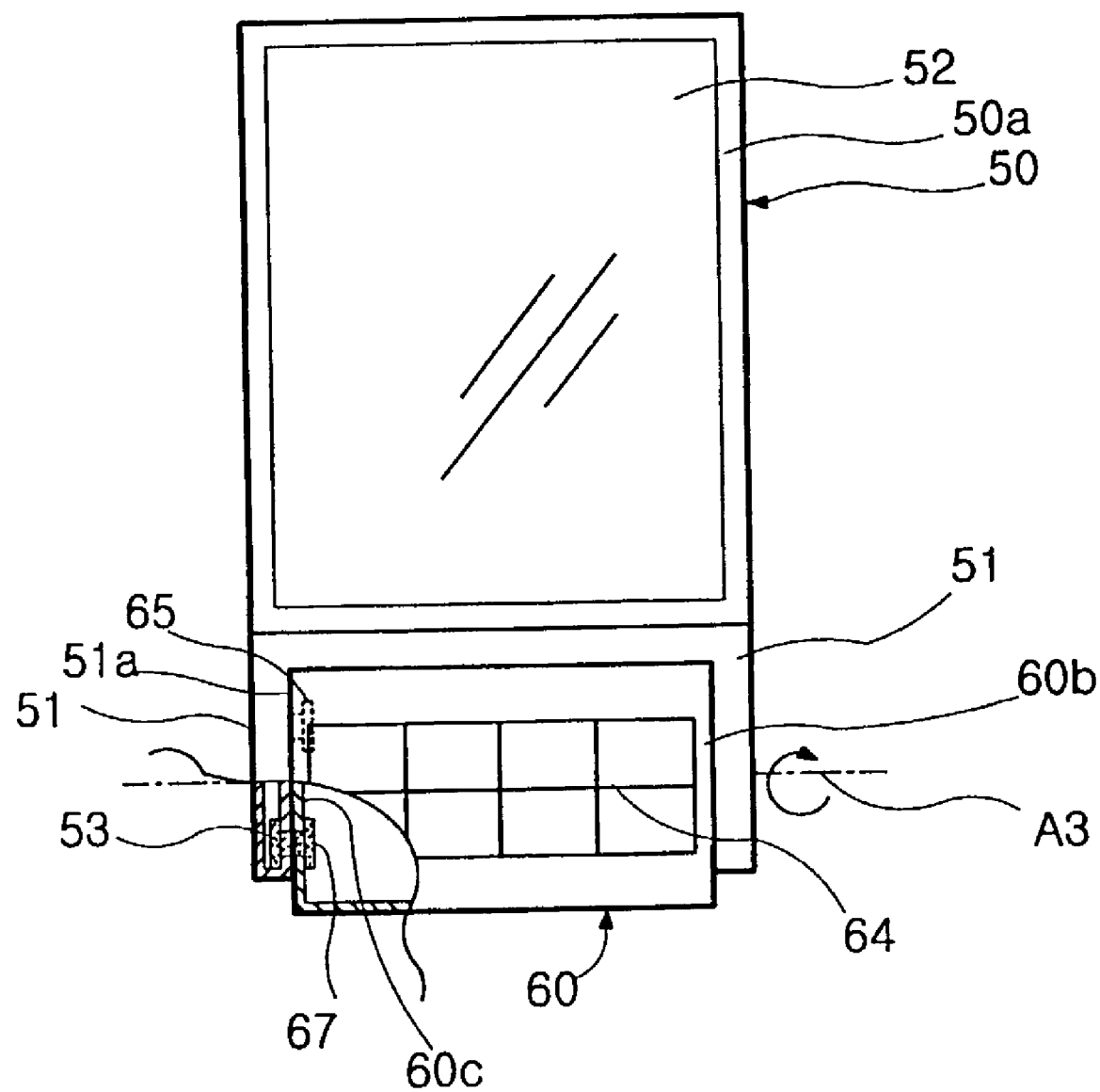
FIG. 12 is a partial-cutaway plan view showing the contact structure of the portable communication apparatus of FIG. 10.

The contact structure of the portable communication apparatus according to the third preferred embodiment of the present invention will now be explained with reference to FIGS. 11 and 12. A third contact portion 53 is positioned on a second lateral surface 51a of one of the pair of arms of the third main housing 50. The first lateral surface 60c of the third rotatable housing 60, rotating in the rotation space S of the third main housing, is provided with a first terminal 65 connected to the first key inputting device 62, and a second terminal 67 connected to the second key inputting device 64. The first terminal 65 is positioned on one side of the first lateral surface 60c of the third rotatable housing 60, while the second terminal 67 is positioned on the other, opposite side of the first lateral surface 60c. Therefore, in a state as shown in FIG. 11, the third contact portion 53 and the first terminal 65 are connected together; while in a state as shown in FIG. 12, i.e. when the third rotatable housing 60 has been rotated 180° relative to the third main housing 50, the third contact portion 53 is connected to the second terminal 67.

For the contact structure described above, the third contact portion 53 has a contact surface exposed on the second lateral surface 51a of one of the pair of arms 51, and the first and second terminals 65, 67 also have contact surfaces exposed on the first lateral surface 60c. This establishes a contact structure between the third contact portion 53 and one of the first or second terminals 65 and 67, whichever contacts the third contact portion 53, their contact surfaces facing each other.

In addition, each of the front and rear surfaces of the third rotatable housing 60 has a determined curvature radius to facilitate rotation in the rotation space S.

Consequently, the portable communication apparatus according to the third preferred embodiment of the present invention realizes a mode change by establishing a selective contact structure between the third main housing 50 and the third rotatable housing 60, depending on whether the third rotatable housing 60 is rotated 180° or not, thus providing a data-inputting expansion.

As described above, the present invention can provide a data-inputting expansion by connecting a rotatable housing to a main housing. Therefore, according to the present invention, complicated data-inputting operation is performed in a very convenient way, from the view point of users, through only a simple rotation of a housing, without using any separate data-inputting device.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable communication apparatus comprising:
   (a) a main housing having a display device;
   (b) a rotatable housing having first and second data-inputting devices on upper and lower surfaces, respectively, the rotatable housing being rotatably connected to a lower end of the main housing;
   (c) a connecting portion exposed on one side of a front surface of the main housing;
   (d) a first terminal exposed on one side of a rear surface of the rotatable housing, the first terminal being connected to the first data-inputting device; and
   (e) a second terminal exposed on the other side of the rear surface of the rotatable housing, the second terminal being connected to the second data-inputting device,
   wherein the rear surface of the rotatable housing and the front surface of the main housing face each other and signals are transmitted by electrical connection between the connecting portion and one of the first or second terminals, as chosen by the rotation of the rotatable housing about a fixed axis extending longitudinally through the main housing and the rotatable housing.

2. The portable communication apparatus according to claim 1, wherein the first and second terminals rotate about a hinge axis.

3. The portable communication apparatus according to claim 1, wherein the first and second terminals are each located an equal distance from and on opposite sides of the hinge axis, and wherein the hinge axis coincides with the longitudinal axis.

4. A portable communication apparatus comprising:
   (a) a main housing having a display device and an annular receiving portion recessed inward from a front surface of the main housing;
   (b) a rotatable housing having first and second data-inputting devices on its upper and lower surfaces, respectively, as well as an annular insert rotatably engaged with the annular receiving portion, the rotatable housing being connected to a lower end of the main housing;
   (c) a connecting portion of the annular receiving portion;
   (d) a first terminal of the annular insert, the first terminal being connected to the first data-inputting device; and
   (e) a second terminal of the annular insert, the second terminal being connected to the second data-inputting device,
   wherein a rear surface of the rotatable housing and a front surface of the main housing face each other and signals are transmitted by electrical connection between the connecting portion and one of the first or second terminals, as chosen by the rotation of the rotatable housing about a fixed axis extending longitudinally through the main housing and the rotatable housing.

5. The portable communication apparatus according to claim 4, wherein the first and second terminals rotate about a hinge axis.

6. A portable communication apparatus comprising:
   (a) a main housing having a pair of arms symmetrically extending in a lateral direction, wherein a rotation space is formed between the pair of arms;
   (b) a rotatable housing having first and second data-inputting devices on upper and lower surfaces, respectively, the rotatable housing being received in the rotation space and being supported by the pair of arms, and being rotatably connected to the pair of arms of the main housing to allow the rotatable housing to rotate about an axis that lies between the pair of arms of the main housing;
   (c) a connecting portion exposed on one arm of the pair of arms;
   (d) a first terminal exposed on one side of a lateral surface of the rotatable housing and axis, the first terminal being connected to the first data-inputting device; and
   (e) a second terminal exposed on an other side of the lateral surface of the rotatable housing and axis, the second terminal being connected to the second data-inputting device,
   wherein signals are transmitted by connection between the connecting portion and one of the first or second terminals, as chosen by the rotation of the rotatable housing.

7. The portable communication apparatus according to claim 6, wherein the lateral surface of the rotatable housing faces the connecting portion of one of the pair of arms.

8. The portable communication apparatus according to claim 6, wherein the first and second terminals rotate about the axis.

9. The portable communication apparatus according to claim 6, wherein the first and second terminals are each located an equal distance from and on opposite sides of the hinge axis, and wherein the hinge axis coincides with the longitudinal axis.

* * * * *